United States Patent
Kikinis

(12) 
(10) Patent No.: US 6,490,725 B2
(45) Date of Patent: *Dec. 3, 2002

(54) TRANSMITTING NOTIFICATION OF NEW VIDEO CLIPS OF INTEREST FROM SERVERS IN WIDE AREA NETWORK

(75) Inventor: Dan Kikinis, Saratoga, CA (US)

(73) Assignee: Elonex I.P. Holdings, Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/741,638

(22) Filed: Dec. 19, 2000

(65) Prior Publication Data

US 2001/0003188 A1 Jun. 7, 2001

Related U.S. Application Data

(63) Continuation of application No. 08/885,676, filed on Jun. 30, 1997, now Pat. No. 6,163,795, which is a continuation of application No. 08/419,021, filed on Apr. 10, 1995, now Pat. No. 5,644,714, which is a continuation-in-part of application No. 08/182,282, filed on Jan. 14, 1994, now Pat. No. 5,515,510.

(51) Int. Cl.[7] ......................... G06F 15/173; H04N 7/173
(52) U.S. Cl. ......................... 725/87; 709/203; 725/114
(58) Field of Search .................... 725/87, 114; 709/203

(56) References Cited

U.S. PATENT DOCUMENTS

| | | | |
|---|---|---|---|
| 3,912,353 A | 10/1975 | Kasuya et al. | 439/329 |
| 4,300,040 A | 11/1981 | Gould et al. | 235/381 |
| 4,532,554 A | 7/1985 | Skala | 358/434 |
| 4,672,373 A | 6/1987 | Mori et al. | 370/406 |
| 4,748,495 A | 5/1988 | Kucharek | 257/713 |
| 4,830,623 A | 5/1989 | Owens et al. | 439/71 |
| 4,901,205 A | 2/1990 | Landis et al. | 361/818 |
| 4,941,040 A | 7/1990 | Pocock | 725/116 |
| 4,991,000 A | 2/1991 | Bone et al. | 257/686 |
| 5,027,400 A | 6/1991 | Baji et al. | 725/116 |
| 5,134,690 A | 7/1992 | Samatham | 710/317 |
| 5,167,035 A | 11/1992 | Mann et al. | 714/4 |
| 5,175,733 A | 12/1992 | Nugent | 370/400 |
| 5,191,410 A | * 3/1993 | McCalley et al. | 725/114 |
| 5,208,665 A | 5/1993 | McCalley et al. | 725/119 |
| 5,341,504 A | 8/1994 | Mori et al. | 712/12 |
| 5,367,521 A | 11/1994 | Sanchez et al. | 370/420 |
| 5,418,713 A | * 5/1995 | Allen | 705/32 |
| 5,426,563 A | 6/1995 | Moresco et al. | 361/689 |
| 5,428,606 A | * 6/1995 | Moskowitz | 370/400 |
| 5,448,661 A | 9/1995 | Takai et al. | 385/24 |

(List continued on next page.)

FOREIGN PATENT DOCUMENTS

WO    WO 95/19673    7/1995

OTHER PUBLICATIONS

Pitt D. et al. "A Hewlett–Packard Video Server" Annual Review of Communications International Engineering Consortium 47(1993/94) Chicago, Illinois Jan. 1, 1993 pp. 392 to 396.

(List continued on next page.)

Primary Examiner—Kenneth S. Kim
(74) Attorney, Agent, or Firm—Woodcock Washburn LLP

(57) ABSTRACT

A video jukebox service has a world-wide array of file servers interconnected by data links and having video input apparatus. Each file server has a plurality of connected clients. Video clippings input at the video input apparatus are shared with the other file servers and stored in a database at each file server. Clients are notified of availability of video clippings, and clippings are downloaded to client stations on demand. In a preferred embodiment, the file server network is a toriodal arrangement, and client communication nodes equal in number to the number of file servers are interconnected in a toroidal fashion as well. Individual client stations are connected to individual ones of the client communication nodes, with the overall network in the form of nested toroids.

23 Claims, 11 Drawing Sheets

U.S. PATENT DOCUMENTS

| | | | |
|---|---|---|---|
| 5,463,671 A | 10/1995 | Marsh et al. | 379/56.1 |
| 5,488,412 A | 1/1996 | Majeti et al. | 725/111 |
| 5,495,397 A | 2/1996 | Davidson et al. | 361/784 |
| 5,508,732 A * | 4/1996 | Bottomley et al. | 725/93 |
| 5,515,510 A | 5/1996 | Kikinis | 709/203 |
| 5,521,631 A * | 5/1996 | Budlow et al. | 725/78 |
| 5,530,754 A | 6/1996 | Garfinkle | 725/8 |
| 5,534,911 A | 7/1996 | Levitan | 725/46 |
| 5,539,621 A | 7/1996 | Kikinis | 361/803 |
| 5,592,664 A * | 1/1997 | Starkey | 707/1 |
| 5,619,249 A | 4/1997 | Billock et al. | 725/5 |
| 5,644,714 A | 7/1997 | Kikinis | 709/219 |
| 5,721,825 A | 2/1998 | Lawson et al. | 709/203 |
| 5,734,719 A | 3/1998 | Tsvedos et al. | 700/234 |
| 5,745,882 A | 4/1998 | Bixler et al. | 705/26 |
| 6,163,795 A | 12/2000 | Kikinis | 709/203 |

OTHER PUBLICATIONS

Ishihara et al., "A Study on Broadband Access Networks for Multi–Media Services", Technical Report of the Institute of Electronics, Information and Communication Engineers (CS94–18) vol. 94, No. 68, p. 51–58, 1994 (May 26, 1994) (Partial translation attached thereto).

Nikkei Electronics "A First Step for Realizing Information Highway" No. 619, Oct. 10, 1994, p. 75–82 Partial translation attached thereto).

Jane W.S. Liu et al, "A fail–safe distributed local network for data communication" AFIPS Conference Proceedings of the 1979 National Computer Conference, New York Jun. 4–7, 1979, AFIPS Press, Montvale, NJ pp. 917 through 925.

* cited by examiner

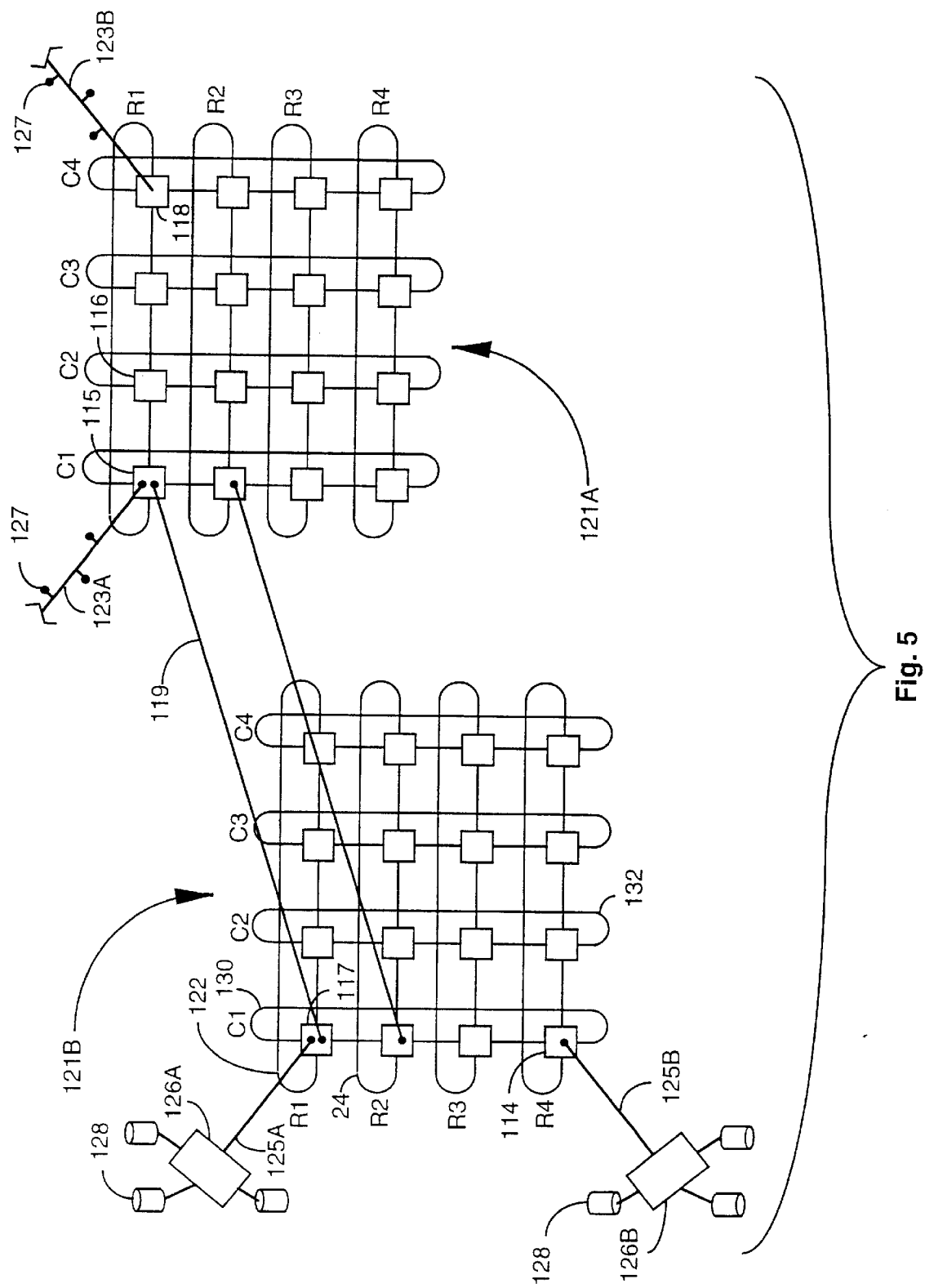

TRANSMITTING NOTIFICATION OF NEW VIDEO CLIPS OF INTEREST FROM SERVERS IN WIDE AREA NETWORK

CROSS REFERENCE TO RELATED DOCUMENTS

The present patent application is a divisional of application Ser. No. 08/885,676, filed Jun. 30, 1997 and entitled "Server for Notifying Items of Interest and Delivering Locally Accessed Video in a WAN to Client Stations on Demand," now U.S. Pat. No. 6,163,795, which is a divisional of application Ser. No. 08/419,021, filed Apr. 10, 1995 and entitled "Video Collection and Distribution System with Interested Item Notification and Download on Demand," now U.S. Pat. No. 5,644,714, which is a continuation-in-part of Application Ser. No. 08/182,282, filed Jan. 14 , 1994 and entitled "Communications Internetwork System Connecting a Client Node Array to a Resource Array," now U.S. Pat. No. 5,515,510.

FIELD OF THE INVENTION

This invention is in the area of information services, and pertains in particular to a service for providing customers selected video information, such as news events and events of special interest, to client in a timely manner.

BACKGROUND OF THE INVENTION

There are presently available services that select video information from available sources, such as network news and other TV programming, and deliver such information to clients. These services fall into two basic categories. A first type of such a service reviews available materials and compiles selected tapes categorized by specific topics. After the time required to preview available materials and compile the tapes, customers who have subscribed for specific categories of information are provided copies of the tapes by commercial carrier.

In this first type of video delivery service, a delivered video tape on the selected topic or topics is played by the client in a conventional VCR. In a variation of the same service delivers organized video information by CD-ROM, which is then viewed by the client on a computer video display using a CD-ROM drive in conjunction with suitable software executed on the computer.

A second type of video delivery service is available by computer on-line services, such as COMPUSERVE, PRODIGY, and DIALOG, wherein a user may conduct a search, or may pay an intermediary to do the search, for information on substantially any topic of interest. In the case of on-line services, a modem installed in or connected to a user's computer is utilized for communicating with the on-line service's host and transmitting or receiving information. Communication is over the installed telephone network.

With a service based on use of individual media, such as video tapes and CD-ROM disks, there is an inherent delay associated with physically organizing subject matter and recording on the deliverable recording media. Time lapse between a real event and delivery of the video tape or CD-ROM may be from several hours to several days.

The second type of video service, based on computer on-line access, although providing a more ready response than the deliverable media service, is still rather slow, and is certainly not user-friendly. At a typical transmission rate of 14.4 kbaud in some faster modems, the time required to download a single video selection may be from 10 to 30 minutes or more, depending on the size of the file. Data compression schemes may be used to reduce the size of a file before transmission, but major improvements in overall response time are still needed.

What is needed is a video jukebox service, a video information service that monitors conventional video sources, and alerts its clients to selected topics as soon as a selection becomes available, and also permits clients to select for downloading only those items the client wishes to view. Preferably, such a service would be scaled to the needs of different clients, having a low-end version operable on existing personal computer hardware systems, and a high-end version requiring special equipment, but having faster transmission and enhanced display quality.

SUMMARY OF THE INVENTION

In a preferred embodiment, a video jukebox system is provided. The system comprises a plurality of computerized file server stations interconnected in a network by first data links, with individual ones of the file server stations also connected to a video input apparatus, such as a VCR device or other device capable of providing video input to the connected file server. There is a plurality of client stations connected by second data links to individual ones of the file server stations. Each file server station with a video input apparatus accepts video clippings from the video input apparatus, stores the clippings in a database, and shares the video clippings with other file servers in the network over the first data links, and wherein each file server notifies connected clients of new video clippings available, and downloads video clippings to clients on demand.

Also in a preferred embodiment, each file server has transactional control routines for tracking client transactions and billing clients. In an alternative embodiment, such transactional accounting may be the business of a dedicated file server in the network.

In various embodiments of the system of the invention, data links can be of various sorts, with a preferred data link being an Integrated Services Digital Network (ISDN) link. In some cases, for clients wishing to have a less expensive system, analog telephone modem links may be used.

In an alternative embodiment of the invention, clients are connected to the system at client communication nodes configured to route messages and packets of data in the system. The client communication nodes are connected together in a toroidal array, the file server stations are connected in a toroidal array, and each client communication node is connected to a file server, there being an equal number of client communication nodes and file servers.

The video clipping service of the present invention, referred to by the inventor as a video jukebox, provides a system for allowing clients access to video clippings of news events and other valuable information much quicker than by any known conventional service. The distinct advantage is that such information rapidly declines in value with age for most purposes.

BRIEF DESCRIPTION OF THE DRAWINGS

FIG. 5 is a diagrammatical illustration of a massively parallel network architecture according to an embodiment of the invention.

DESCRIPTION OF THE PREFERRED EMBODIMENTS

Figure 1A:
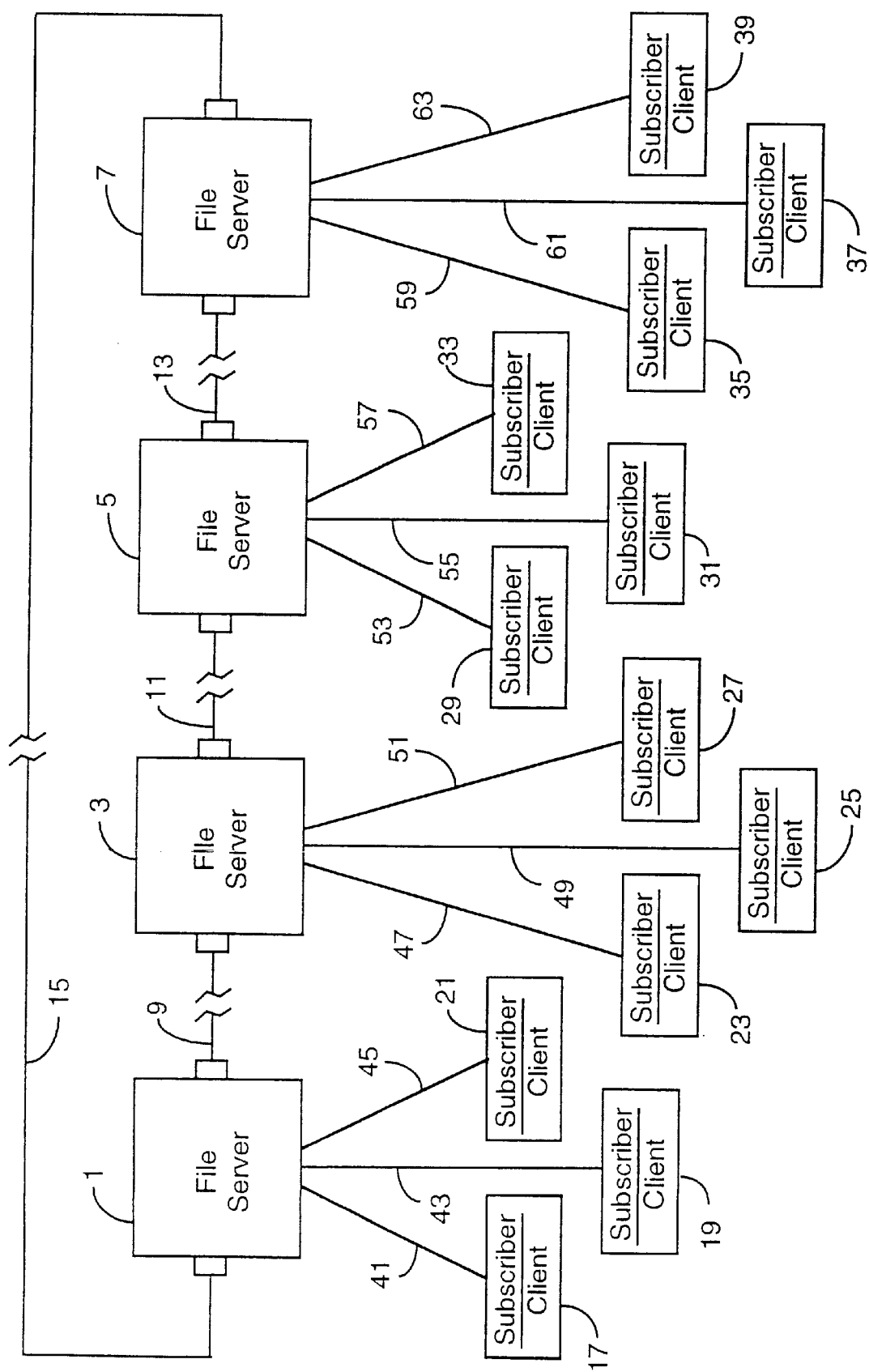
FIG. 1A is a diagram of a global network architecture for a video jukebox system in an embodiment of the present invention.

FIG. 1A is a diagram illustrating a Video Jukebox worldwide architecture in an embodiment according to the present invention. File server 1, file server 3, file server 5, and file server 7 are all interconnected by ISDN links 9, 11, 13, and 15 respectively. Servers 1, 3, 5, and 7 are exemplary of file servers in such a network, and in other embodiments there may be more or fewer such servers. ISDN links 9, 11, 13, and 15 interconnect file servers 1, 3, 5, and 7 in this embodiment in what is known as a token ring architecture. It will be evident to those with skill in the art that there are many other conventional architectures that may be used, and the inventor discloses herein a unique architecture with distinct advantages for such a unique video jukebox service. The unique architecture is discussed in detail below.

Each file server is also connected to local clients, as is also shown in FIG. 1A. File server 1 serves local subscribers 17, 19, and 21 over links 41, 43, and 45 respectively. File server 3 serves local subscribers 23, 25 and 27 over links 47, 49, and 51. File server 5 serves local subscribers 29, 31, and 33 over links 53, 55, and 57. Lastly, file server 7 serves local subscribers 35, 37, and 39 over links 59, 61, and 63.

Referring still to FIG. 1A, it will be apparent to those with skill in the art that there are many network architectures well known in the art that might be used for interconnecting the file servers, and the connections from file servers to clients need not be direct from each file server to each client as shown in FIG. 1A, but may be done by alternative known network architectures as well.

In a Video Jukebox Service using the architecture of FIG. 1A, or other interconnection architecture, individual file servers are located worldwide at major sites of customer concentration, such as major cities and capitals of various countries, such as Washington, D.C., New York City, and Los Angeles in the United States, London, Paris, Tokyo, Moscow, and so on.

At each server site, local employees are engaged in reviewing and loading video generated in the local area. The video productions may be considered as video clippings, borrowing a term from the printed news media. Clippings selected for addition to a worldwide database are cross-referenced according to an index, which lists each clipping under all possible topics of interest. For example, a video clip of an oil rig explosion in the gulf of Mexico may be indexed under petrochemicals, environmental news, events in Gulf of Mexico, worldwide disasters, and so on.

Clippings compiled and cross-indexed at each server site are transmitted at regular intervals in a high-resolution video format to all other file server sites in the worldwide network. For example, sharing bursts between servers may be timed to occur at five-minute intervals. Clippings transmitted from each server site are stored for ready retrieval at all other server sites.

At each server site, all clippings stored and ready for transmission to clients are represented in the database by a brief synopsis (abstract), the date acquired, and, in some cases, by other pertinent information.

Paying clients of the video service, at the time of subscription, specify the topics of their particular interest and provide details of their local receiving equipment, which must be of a type compatible with the worldwide network. Each time a new clipping is made available, file servers in each area send a message to clients who have subscribed to the categories appropriate to the new clipping.

Clients can monitor their service as often as they like for newly available video in the areas of interest they have indicated, and can then select clippings they wish to see. When a client selects one or more clippings, the video data is sent to the client on the interconnecting link to the server in a compressed mode, and the client can either store or immediately view the data sent.

Figure 1B:
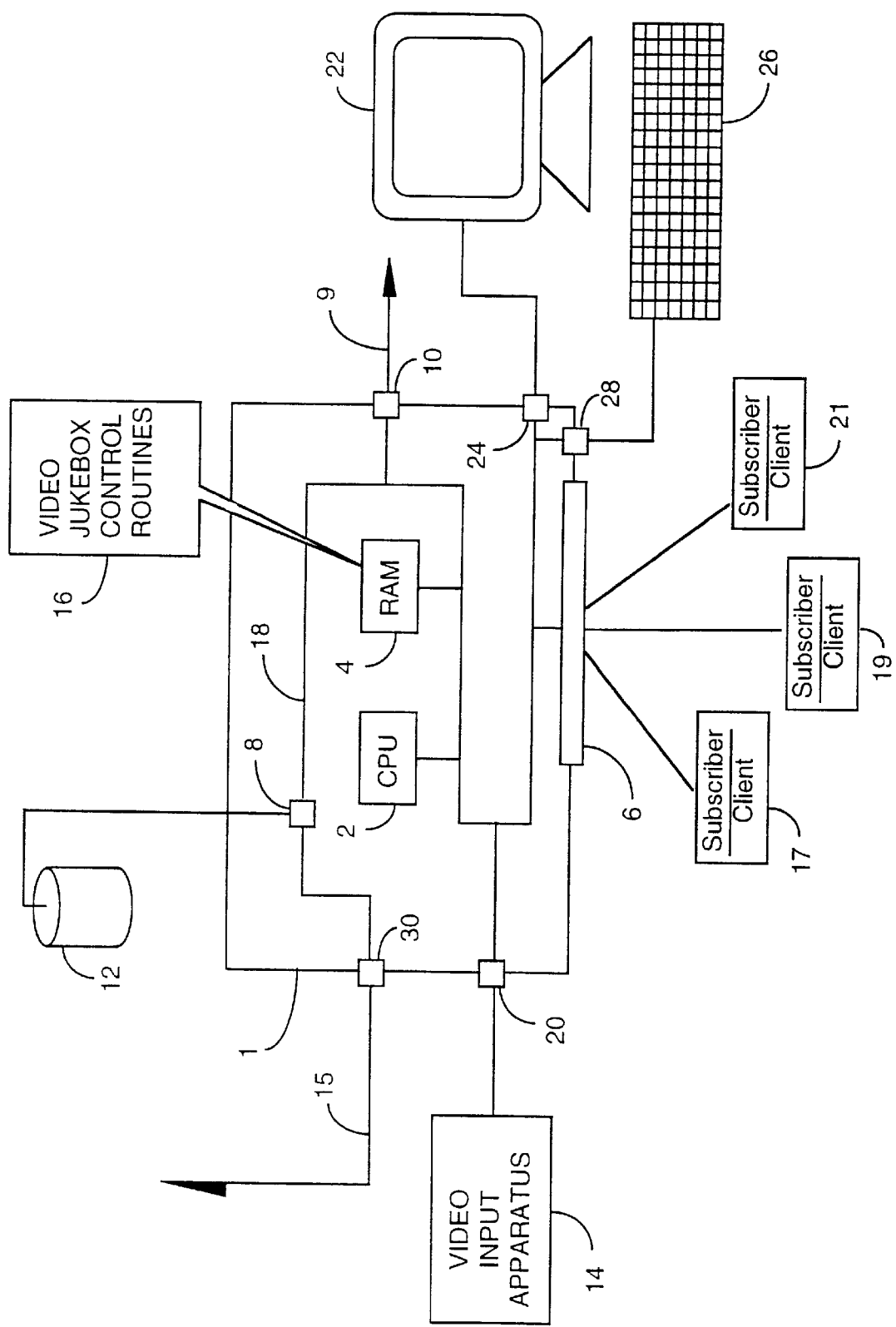
FIG. 1B is a diagram showing a file server of FIG. 1A in more detail.

FIG. 1B is a diagram showing file server 1 in additional detail, and, by example, the architecture of all other file servers in the global architecture. A CPU 2 and a random-access memory (RAM) are connected to an internal bus 18, which also connects to network ports 10 and 30 that couple file server 1 with other file servers on the network.

Another interface 8 connects to at least one hard disk drive 12. There may more than one such drive, and other sorts of non-volatile memory may be used as well. The non-volatile storage provides space to store the numerous video clippings entered, cross indexed, and provided to subscribers on demand.

Yet another port 20 provides communication with video input apparatus, which may be in any one of several forms, such as one or more video tape units, television channel monitoring apparatus, and the like, encompassing all sorts of video sources. This apparatus allows video selections to be accessed and viewed by an operator, who then flags selections and provides an abstract and an identifier, and causes annotated clippings to be input via port 20 and stored in non-volatile memory 12.

The operator who selects and annotates has access to the system through a display 22 via a display port 24 and a keyboard 26 via a keyboard port 28. Port 6 provides communication with subscribers 17, 19, and 21, and there may be more subscribers connected in other network configurations.

Control routines 16 reside in RAM 4 during operation, and provide the unique functionality of the file server for operation as a Video Jukebox according to the present invention.

As was described above, the file servers are sited at locations of customer concentration, coinciding as much as possible with central location for monitoring major news events and items of interest to subscribers. Considering file server 1 as described above to be so located, video clippings selected, annotated, and fed into the system at file server 1 are made immediately available to subscribers 17, 19, and 21, representing all subscribers connected to server 1.

In addition, the same video input, besides being stored in non-volatile memory 12, is provided via ports 10 and 30 to all other file servers in the global network, which store these clippings and make them immediately available to connected subscribers. Also, ports 10 and 30 function to receive video clippings from other servers on the global network, which are then stored at server 1 and made available to subscribers 17, 19, and 21.

Figure 2:
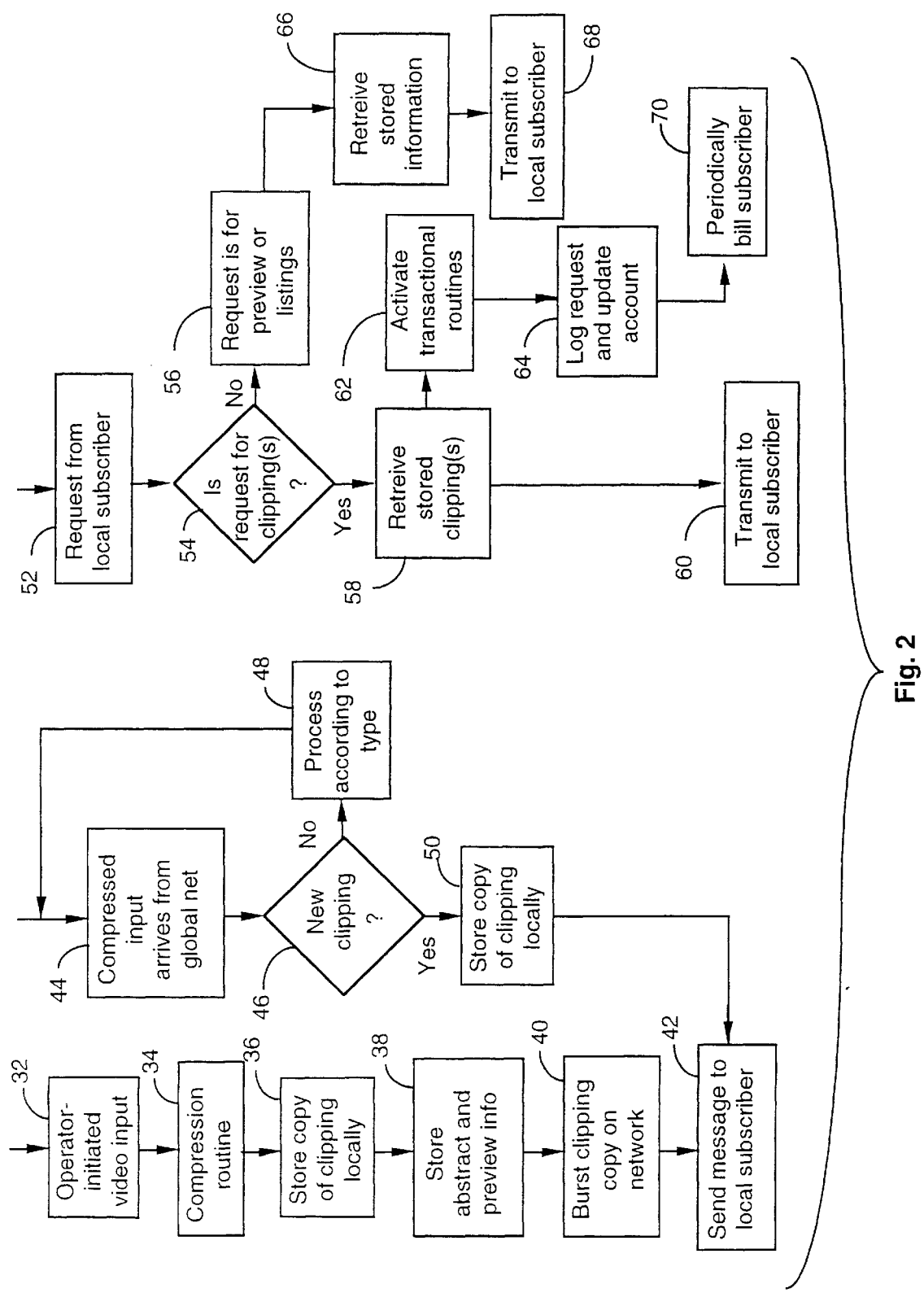
FIG. 2 is a diagram depicting control flow in some critical automated operations at the file server of FIG. 1B.

FIG. 2 is a flow diagram indicating the functionality of control routines 16 executed on the file servers in the global network of file servers. There are at least three different inputs that may be expected at a local file server: (1) an operator-triggered and annotated local video input, which will be in most cases a new video clipping to add to the database (2) a compressed clipping received from another server, which will be in most cases a new clipping to be stored and shared with local subscribers as well, and (3) a request from a local subscriber, which in most cases will be a request for downloading one or more clippings.

At step 32 a new annotated clipping is caused to be loaded by an operator, and is recognized as such by control routines 16. The control routines, recognizing the new annotated local clipping, execute a compression routine at step 34, which may be any of several conventional sorts. A suitable compression protocol is the Motion Picture Experts Group (MPEG) protocol, which is a well-known industry standard protocol. The new clipping is compressed.

At step 36 the new clipping is stored locally (FIG. 2, memory 12). In the local storage, certain annotation, such as abstract and preview information, is stored to be accessible separately from the clipping itself (Step 38). Also, a copy of the new clipping, together with the annotation, is burst at step 40 to other file servers on the global network, to be stored and made available to subscribers connected to the other file servers on the global network, which also store the clipping and make it available to locally-connected subscribers. Finally, at step 42, local subscribers who have indicated an interest in the subject matter to which the new clipping pertains are notified by a standardized protocol. This notification is preferably in the form of E-mail which the subscribers may access at their leisure or pleasure.

At step 44 a compressed input from a remote server is received and recognized. In most cases a compressed packet received from a remote server will be a new clipping being shared with other servers, but there are some instances in which other information might be received from a remote server, so a received packet has to be tested, which occurs at decision step 46.

If the received packet is other than a clipping, control diverts to step 48, and the received packet is processed according to instructions either prestored or received as a part of the packet. If the received packet is a new clipping, control goes to step 50, where the new clipping is stored locally to be available for downloading by locally connected subscribers. At step 42 a message is sent to locally connected subscribers just as is done in the case of a new clipping loaded locally.

At step 52 a request is received from a local subscriber. Such a request will, in most cases, be a request to download one or more clippings. There are other types of requests, however, such as a request for billing information or preview information, such as an updated list of available clippings on certain subjects. A decision is therefore made at step 54 as to the nature of the request. If the request is not for clippings, control is diverted to step 56 where appropriate routines are executed and appropriate action taken, according to the request. For example, the request may be for preview or listings, in which case stored information is received at step 66, and the information is sent to the requesting subscriber at step 68.

If the request from a local subscriber is for one or more clippings, the requested clippings are retrieved at step 58 and sent to the subscriber at step 60. At step 58, assuming a request for downloading, another control path is initiated resulting in activation of an accounting. procedure at step 62. At step 64 the request is logged and billing information is updated. Subscribers are periodically billed at step 70, which may be done by an E-mail service, just as in sending preview and listing information to subscribers.

Periodic automatic billings are made to each customer complete with a history for the immediate period of all of the services requested, the individual prices, and the total amount owed. In some case, wherein deposit accounts may be maintained, appropriate arithmetic is performed on a customer's account to deduct an immediate billing automatically from a client's balance. It will be apparent to those with skill in the art that the control routines and steps for accounting may vary widely from the example given here, and still be within the spirit and scope of the invention.

In addition to the functions described above with reference to FIG. 2, there are certain maintenance functions not shown that are typically performed by an operator, such as a systems administrator. For example, new clippings cannot simply be added to the database forever. At some point clippings that are obsolete need to be removed. Deletion may be done only by an authorized administrator, but automated accounting may be used to track to times and frequency of access of individual clippings. Other system administration functions are similar to such functions known in the art performed for information systems.

The distance between file servers in the global network for this video jukebox system is typically at least hundreds of miles. There are a variety of communication methods that might be used between servers, bearing in mind the very high data traffic that will be required and the need for quick transmission. In one embodiment the inter-server connections are ISDN telephone links. The connections in this case are hardwired. In other embodiments fiber optic and wireless communications, such as conventional microwave and satellite systems may be used.

In a preferred embodiment, local subscribers are connected to a local file server also with a high-speed ISDN link. In an alternative embodiment subscriber connections are by modem over analog telephone lines. Such connections are not mutually exclusive, and several different connection protocols may be available at each server, and not necessarily the same selection at all servers, to provide a sufficient range of subscriber flexibility.

Figure 3:
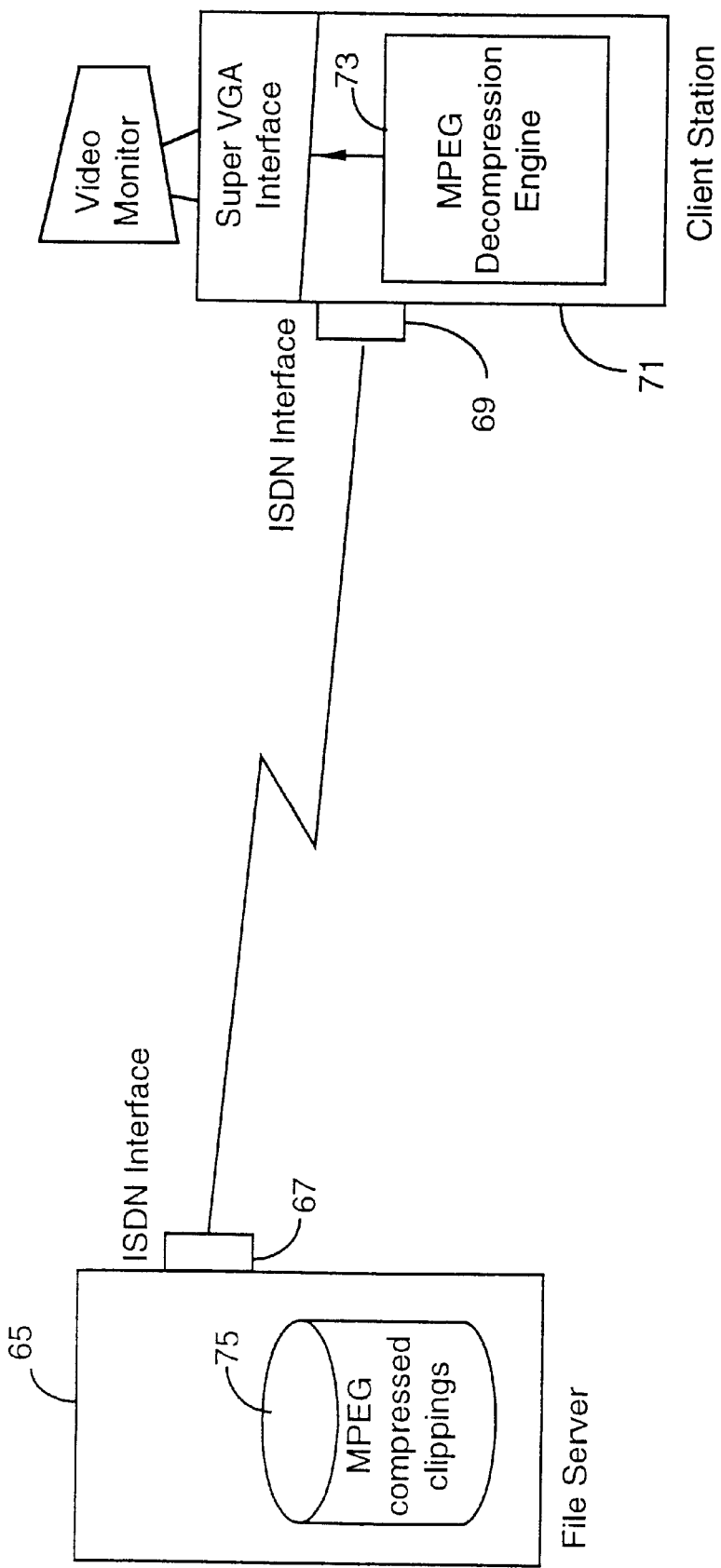
FIG. 3 is a schematic representation of a connection between a client station and a file server in an embodiment of the invention.

FIG. 3 illustrates a user connection with a file server using a 128 KBaud ISDN interface. In FIG. 3, file server 65 has a complement of stored clippings in a memory system 75 available to subscribers, and the clippings are typically compressed, both to save storage space and to save transmission time. ISDN interface 67 is connected to similar interface 69 at a subscriber's site 71, which may be a home or office. Requests are received at file server 65, and compressed clippings, as requested, are uploaded and sent to the subscriber according to the protocols described above with reference to FIG. 2. Again, MPEG is a suitable compression format.

User system 71 in this embodiment includes a MPEG decompression engine 73 providing decompressed video data to, for example, a Super VGA video adapter driving a high-resolution video monitor. Assuming a video clipping with a 30 second playing time, the ISDN interface at 128 KBaud can transmit all the data in about 30 seconds, and the decompression engine can perform its function in about 15 seconds.

Figure 4:
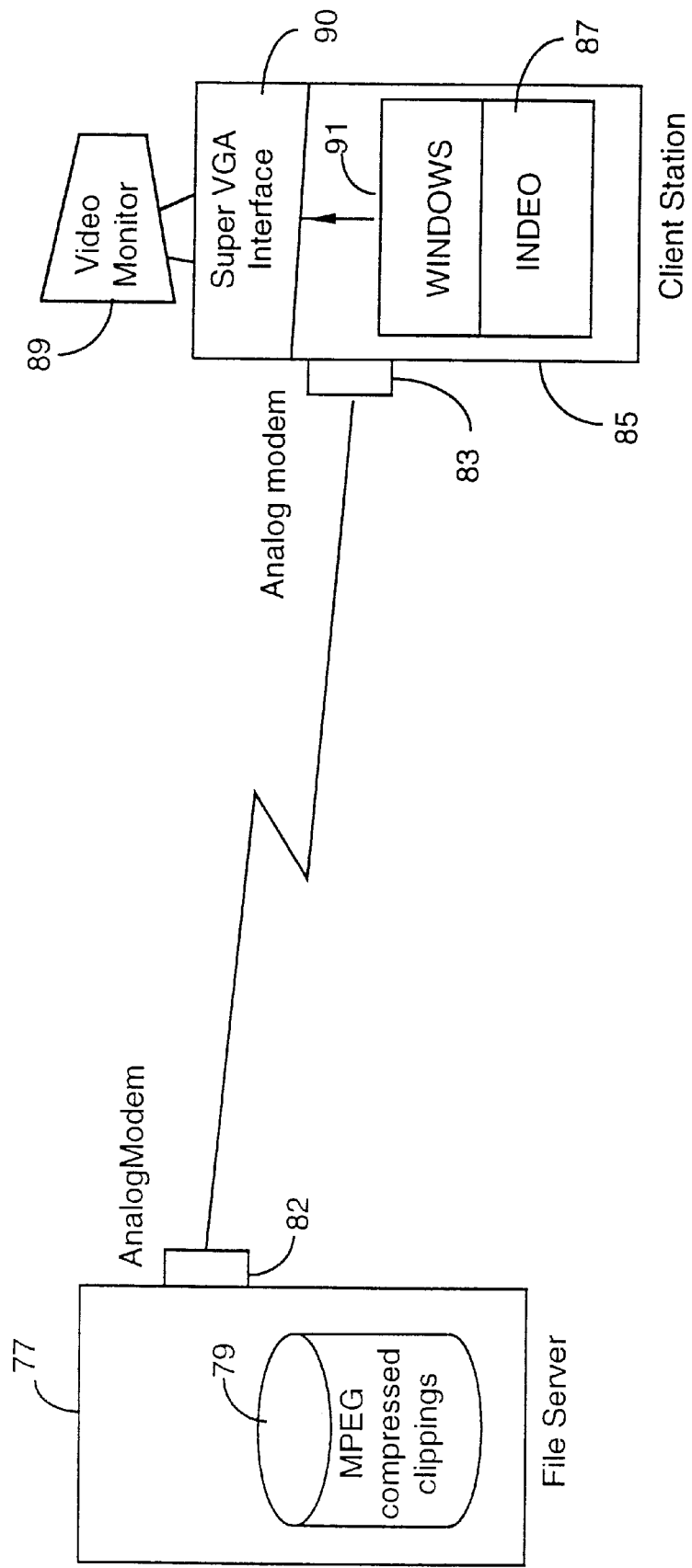
FIG. 4 is schematic representation of an alternative conneection between a client station and a file server.

FIG. 4 illustrates another file server to PC connection more suitable for less frequent or demanding clients. In this embodiment, server 77 is the same as server 65 in FIG. 3, having MPEG compressed clippings in a memory 79, except there port to communicate with clients is a modem port 81. A 14.4 KBaud modem is shown, but other transmission speeds may be used as well. In this embodiment the client's system 85 comprises software such as INDEO™ 87 for receiving and decompressing the MPEG compressed clipping file. The software runs under an operating system such as Windows™ 91, and data is provided to a video monitor 89 through a Super VGA interface 90.

Using the system with the connections shown in FIG. 4 data for a video clipping can be transmitted to a client in about 6 minutes.

Video Jukebox with a Massively Parallel Global Network

For a video jukebox system according to the present invention, given the global nature of the network and the likelihood of very numerous clients for each of the file servers as well as near continuous communication between file servers and between file servers and clients, a massively parallel network system is very desirable. Such a system is described below applicable to the video jukebox system described above. The massively parallel network is disclosed in patent application Ser. No. 08/182,282, and the present patent application is a continuation-in-part of application Ser. No. 08/182,282.

Typically, large client-server computer network systems exhibit topology having a single file server that acts as the center of the system's operations. The file-server is usually based on a microprocessor, and is dedicated to handling large data manipulation and flow as requested by a number of clients. Clients, or client nodes, may be a number of different electronic devices including but not limited to: desktop workstations, personal computers, mainframe or minicomputers, telecommunication equipment and dumb terminals. System resources are typically provided by large electronic storage devices associated with the file server. These resources include data, application programs for clients, and the network operating system. The file server, operating according to the network operating system, performs traffic management functions and provides security for the data. The file server also performs information retrieval and may do computations or specific record searches within a database.

Client nodes and file servers in computerized networks such as Ethernet, ARCnet and AppleTalk must be connected via a transmission medium, commonly some form of cabling. The physical layout (topology) of a large client-server network routes all client requests to the file server. Conventional bus systems limit the number of direct connections. To maintain an acceptable degree of connectivity such networks typically employ a hub or concentrator connection as a subsystem. The hub serves as a junction box for connected nodes and passes the data between client and file server by a separate dedicated network trunk. Large network systems may have layered hubs to provide connectivity to more nodes while still using a single file server.

The file server is limited by the bus connection to a conventional network during periods of heavy client use. As demand increases, data throughput to and from clients saturates, and system performance is limited. To maintain acceptable performance, conventional networks have incorporated second level servers that perform limited functions of the primary server and eliminate waiting by clients in some cases. Typically, data is stored separate from the primary server and later, at a convenient time, such as once a day or perhaps as often as once an hour, the secondary server downloads to the primary file server. In these systems, real-time operation is not possible. Also, at higher demand, the bus systems for both the second-level servers as well as the primary server saturate, and system-wide performance is again limited.

What is needed, especially for such systems as the video jukebox system described above, is a computer network architecture that maintains substantially real-time performance for large numbers of clients and resources, such as globally distributed file servers.

FIG. 5 is a diagrammatical illustration of a massively parallel network architecture according to an embodiment of the present invention. One matrix 121A comprises sixteen interconnected client nodes (CN). Another matrix 121B comprises sixteen resource nodes (RN). In the case of the Video Jukebox system described above, the client nodes are clients, and the resource nodes are file servers in the global network.

The illustrated four-by-four matrices of FIG. 5 are exemplary, and those with skill in the art will recognize that the matrix dimensions may vary. In many applications of massively parallel networks according to the present invention, the matrices will be much larger.

In the description of the network of FIG. 5, it is helpful to refer to the location of each client node and resource node by a matrix location CN(x,y) and RN(x,y) where x is a row number and y is a column number. In each array 121A and 121B in FIG. 5, the row and column numbers are labeled by numbers in parentheses. For example, node 115 has a matrix position 121A(1,1) and node 116 has a matrix position 121A(1,2). In matrix 121B node 117 occupies position 121B(1,1).

In the embodiment illustrated by FIG. 5, matrix 121A functions as a client array and matrix 121B functions as a resource array. The distinction is by the nature of connections to the nodes in each array.

The nodes in the client array connect by communication links to client networks. Two such networks 123A and 123B having client stations such as stations 127 are shown connected to node 115 and to node 118. These client networks may be configured as any one of many local area network configurations known in the art, or remote network configurations implemented by such as telephone links. There are many known arrangements for connecting such client groups. In a full implementation, each client station in the client array connects to a client network. Also, there is no requirement that each client network be of the same form and nature.

In this embodiment, matrix 121B functions as a resource array. Resource nodes are connected by communication link to resource devices. One such connection 125A links resource node 117 at position 121B(1,1) to a hub 126A leading to resources shown as generic disk drives 128. A similar connection 125B is shown linking resource node 114 at position 121B(1,4) to a hub 126B connected to other generic resources 128. In a relatively simple implementation, each resource node is linked to a single resource, and in a full implementation, each resource node may be connected to a hub connecting several resources.

The system in this embodiment is massively parallel by virtue of the communication links between nodes. The nodes in each row in each array in this example are connected serially in a ring. For example, in matrix 121B, in row (1), node (1,1) is linked to node (1,2), which is linked to node (1,3), which is linked in turn to node (1,4). Node (1,4) is linked back to node (1,1), so the four nodes are linked in a ring 122. Similarly nodes (2,1), (2,2), (2,3) and (2,4) are connected in ring 124, and so on.

The nodes in each column are also serially ring connected in the same manner as described above for rows. For example, in matrix 121B, nodes (1,1), (2,1), (3,1), and (4,1) are connected in ring 130. Similarly the nodes of column 2 are ring connected in ring 132, and the nodes of column 3 and column 4 are similarly ring connected.

The unique connection scheme results in each node in the resource array being linked to each adjacent node in its row position and in its column position. By virtue of the ring nature of the connection, each node is connected by communication link to four other nodes in the array.

The row by row and column by column ring connection is duplicated in the client array 121A. To complete the massively parallel connectivity in this embodiment, each client node is connected to a resource node. In this embodiment the connection is by matrix position. For example, client node 115 at position 121A(1,1) is linked to resource node 117 at position 121B(1,1) by link 119. A similar link (not shown) is established between 121A(1,2) and 121B(1,2), between 121A(1,3) and 121B(1,3), and so on.

The communication flexibility of the system shown may be illustrated by following a request for data from any client station 127 on network 123A linked to client node 115 at position 121A(1,1). In this example the data request is for data stored at a resource device 128 on link 125B connected to resource node 114 at position 121B(4,1). From client node 115 the data request may be routed via any one of five branches, each of four to an adjacent client node, or to resource node 117 at position 121B(1,1) via link 119. In this example, assume the request is routed directly to the resource array via link 119, as might be preferable in a low-demand state.

At resource node 117 there are four choices for routing, one link to each of the four adjacent resource nodes. The fifth link, to resources on link 125A, is not an option, because the request is for data available only on link 125B. The most direct route, assuming the next node is not busy, is directly from resource node 117 to resource node 114, which is an adjacent node in ring 130. In considering alternative routing, the very large number of choices is immediately apparent.

Figure 6A:
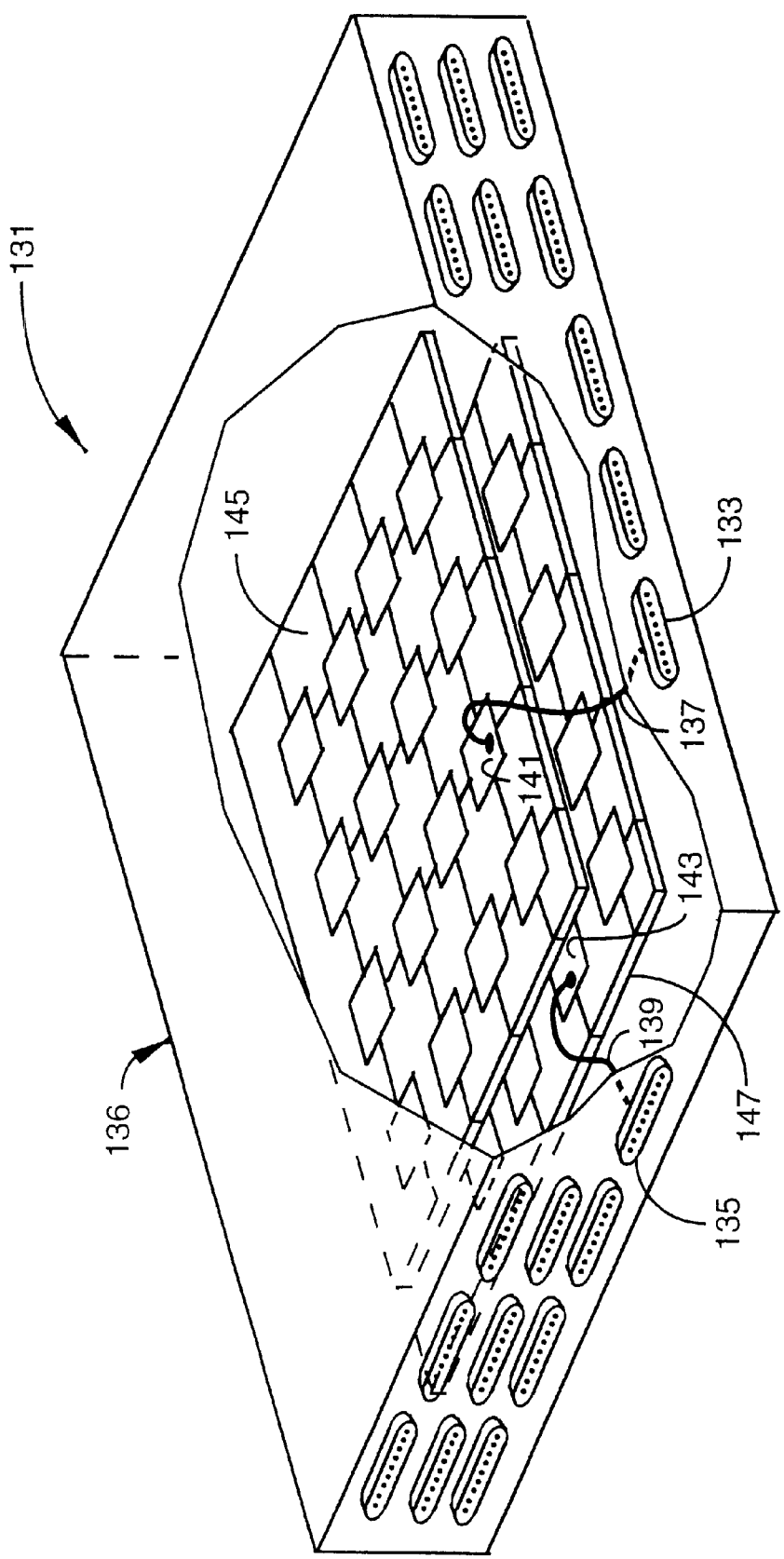
FIG. 6A is an isometric drawing of a massively parallel network device according to an embodiment of the invention.

FIG. 6A is an isometric view of a massively parallel network system substantially according to the arrangement described above with reference to FIG. 5. System 131 comprises two printed circuit boards (PCBs) 145 and 147, and each PCB comprises a matrix of integrated circuits (ICs) as nodes linked by communication links substantially as shown for the nodes of the arrays of FIG. 5. PCB 145 is a client array and PCB 147 is a resource array. Each IC node on each PCB comprises a microprocessor.

PCB 145 in this embodiment comprises 16 ICs in a 4×4 matrix, and PCB 47 comprises 16 ICs in a 4×4 matrix, just as in FIG. 5. IC 141 is located, for example, on client array PCB 145 at matrix position 145(4,2), and IC 143 is located on resource array 147 at matrix position 147(3,1). In this embodiment, the PCBs are supported in a case 136, and each IC node on each PCB has a dedicated bus port with a connector positioned in a wall of case 136. For example, IC 141, a client node on PCB 145, links to communication port 133 via bus 137, and IC 143, a resource node on PCB 147, links to resource port 135 via resource bus 139. There are 32 connectors, of which 16 are client network ports for connection to client networks, and 16 are resource ports for connecting to resources.

Those with skill in the art will recognize that the characteristics of the connectors will depend on the characteristics of the buses connected, and there are many choices in the art. There may be circuitry associated with each port for modulating between the data characteristics of each network or resource link and the associated bus to each IC in the system. System 131 may also comprise support circuitry for a conventional computerized system such as, but not limited to, a BIOS system and power supply. These elements are not shown in FIG. 6A.

In an alternative embodiment, system 131 also comprises circuitry to monitor each port for information management purposes such as determining the nature of the connection. For example, installed SCSI and/or Ethernet equipment. Also, it is not strictly required that there be a dedicated port for each IC node on both matrices. A lesser number of ports may be provided, with some ports serving more than a single node in the massively parallel architecture.

Figure 6B:
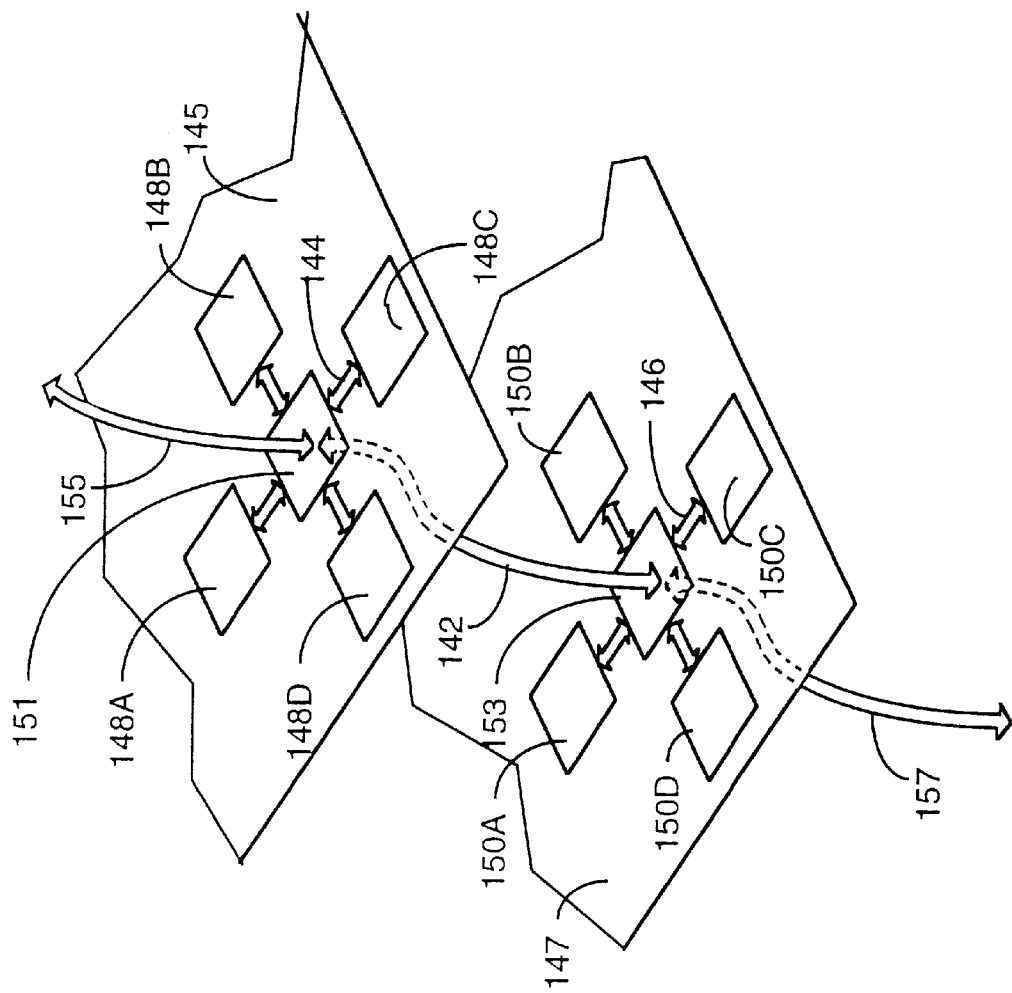
FIG. 6B is an isometric drawing of a portion of the network device of FIG. 6A.

FIG. 6B is a largely diagrammatical isometric illustration of a portion of each of PCBs 145 and 147 in the embodiment shown in FIG. 6A. Client node 151 on PCB 145 communicates via links 144 to the four adjacent nodes 148A, 148B, 148C and 148D. The links in one direction are a part of the row ring connection previously described, and the links in the other direction are a part of the column ring connection previously described.

Resource node 153 on PCB 147 communicates via links 146 to the four adjacent nodes 150A, 150B, 150C and 150D. Again the links in one direction are a part of the row ring connection previously described, and the links in the other direction are a part of the column ring connection previously described. Links 144 and 146, and other links between nodes not shown, may be any one of a wide variety of known communication connection types, including, but not limited to parallel, serial and optical digital and/or analog transmission links. The necessary hardware and firmware for managing the communication at each node is a part of the circuitry at each node, and depends on the nature of the links. For example, if a communication link is a serial connection, the modulation and demodulation circuitry for converting digital data to and from the serial protocol is a part of the circuitry at each node. Also, although the nodes are described as single ICs, this structure is preferable and not required. each node could as well be implemented in two or more ICs with connective traces and structure.

Although not explicitly shown in FIG. 6B, nodes 151 and 153 are an associated pair in the matrix geometry (see description of matrices above). That is, nodes 151 and 153 have the same (x,y) address on different arrays. Accordingly, these two nodes are connected by another communication link 142. Moreover, a client LAN 155 is connected to client node 151, and a resource link 157 is connected to resource node 153. Similar links, not shown, are made to the other resource nodes and client nodes in FIG. 6B. Although it is not required, in the preferred embodiment described, arrangement of the nodes in square matrix arrays on PCBs, and alignment of the PCBs, brings associated nodes in proximity for connection.

Figure 7:
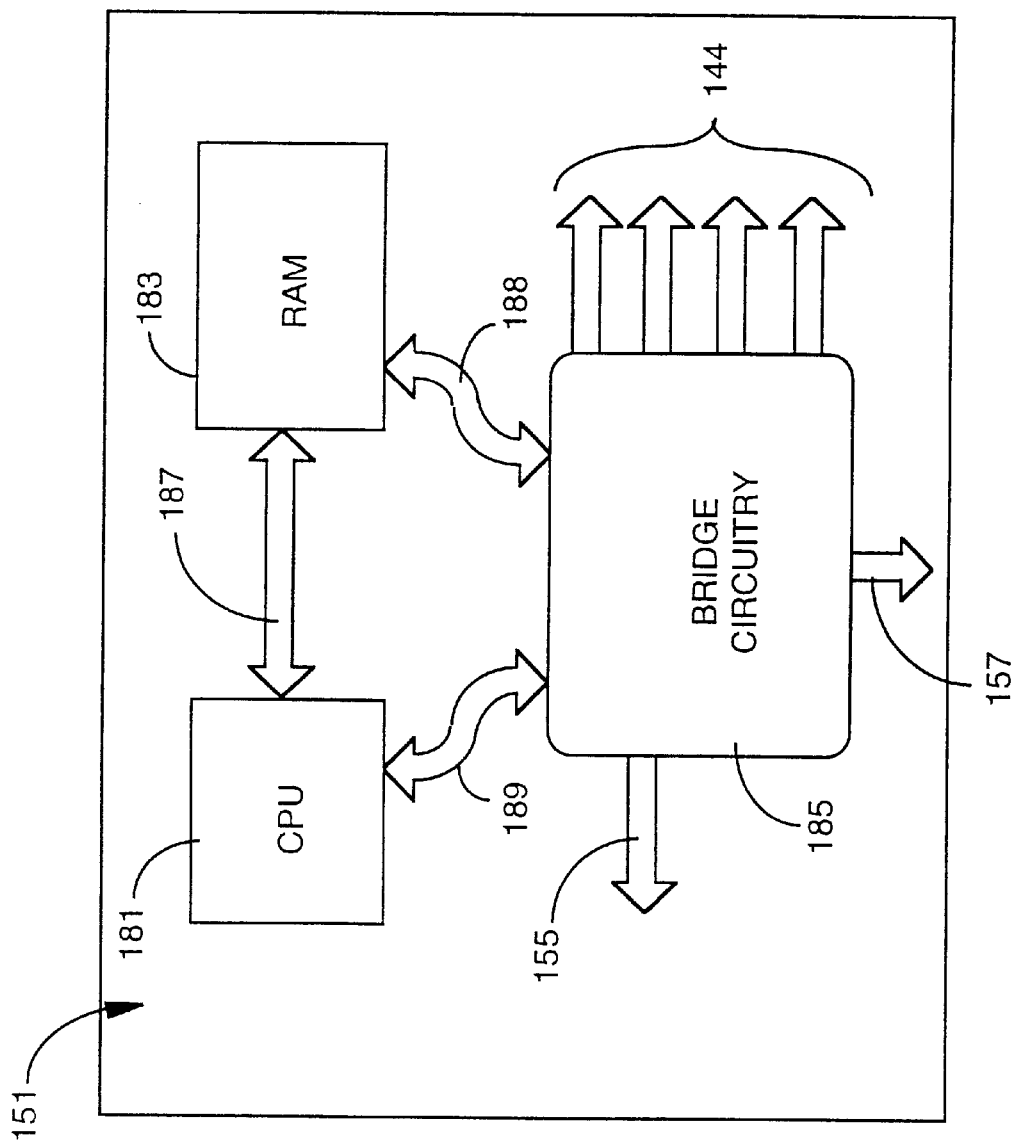
FIG. 7 is a plan view block diagram of a microprocessor node according to an embodiment of the invention.

FIG. 7 is a block diagram plan view of client node 151 according to a preferred embodiment of the present invention. The same drawing may represent resource node 153 and other nodes in either matrix. A node is a client node or a resource node by nature of connection to resources or clients, rather than by particular physical structure.

Node 151 comprises a CPU 181, a memory unit 183 and routing bridge circuitry 185. In this embodiment the memory unit is random access memory (RAM). It will be apparent to those with skill in the art that other types of electronic memory may be used as well.

Control routines stored in memory 183 are accessed and operated by CPU 181 to manage data flow and logical functions for the local node. Outputs from CPU 181 configure bridge circuitry 185 for routing requests and data in the network. In node 141, CPU 181 is linked to RAM 183 by bus 187 and to bridge 185 by bus 189. A third bus 188 in this embodiment links bridge circuitry 185 with memory 183. In one embodiment, bus 188 has an extra wide bandwidth.

Links 144 are links to adjacent nodes on the same PCB as described above. Link 155 is the link to a client LAN in this example via an outside connector, and link 157 is the link to an associated node in the resource array. In the case of a resource node, link 157 would be the link to a resource or a resource hub. An advantage of RAM at each node is that control routines may be accessed and updated, and orchestrated from outside computer equipment to provide for optimum operation.

An important purpose of the massively parallel architecture according to embodiments of the present invention is to provide resources from numerous points to clients at numerous other points while minimizing delay and maximizing data flow rate. This is accomplished by providing a very large number of alternative paths (massive interconnection) for requests and data, and by providing intelligent nodes for routing the data and requests through the massively parallel architecture in an efficient manner. To accomplish this end, as stated and described above, each node has a microprocessor, thus machine intelligence, together with stored instructions and information for accomplishing efficient routing. It will be apparent to one with skill in the art that there are many alternative schemes for routing that may be used, and that the control routines might take any of a large number of forms.

In one embodiment, each node is provided with a map of clients and resources, detailing to which nodes the clients and resources directly connect. Moreover, in this embodiment, each node is "aware" of its own position in the network architecture.

The essential nature of much information to be routed through such a network is analog. For example, such networks are useful for routing television (video) programs and clippings from storage (resources) to clients on a network. The essential nature of the network and the nodes is digital. Although there are a number of ways data may be transmitted between nodes, such as parallel bus and serial link, the data is managed digitally at each node.

Figure 8:
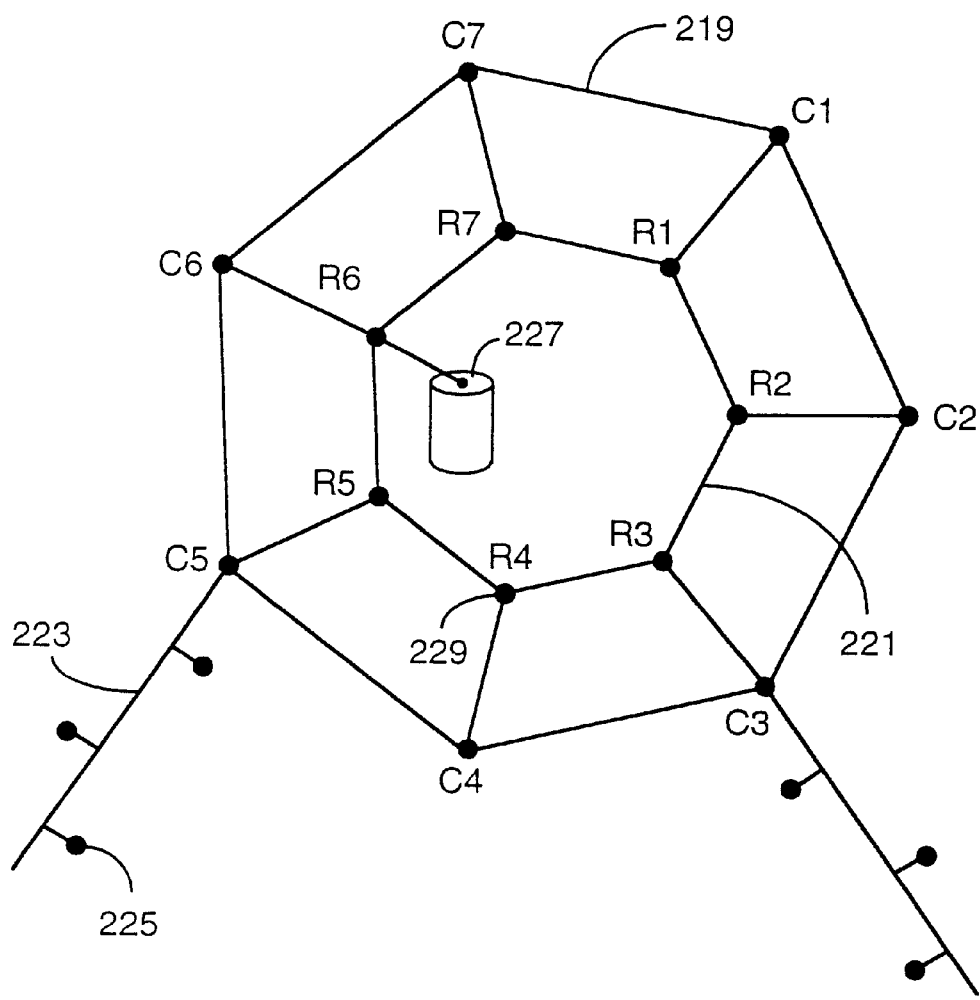
FIG. 8 is a two-dimensional view section through a massively-parallel network according to an embodiment of the invention.

Following the example of video networking for such as TV movies, clippings, and other selective programming, FIG. 8 is a two-dimensional slice through a massively parallel network in an embodiment of the present invention, dedicated to providing TV movies and/or clippings to clients. FIG. 8 may also be taken as an example of a Video Jukebox system based on the massively parallel concept, as described above. The same diagram may represent a massively parallel network for many other applications. Ring 219 represents a portion of a client array, and ring 221 represents a portion of a resource array. The portion represented, in the terms of the above descriptions, could be either a single row or a single column in each array. Connections in each array in the third dimension are not shown for simplicity.

In FIG. 8, client nodes are labeled C1, C2, . . . C7, and resource nodes are labeled R1, R2, . . . R7. A client network 223 is connected to client node C5 and has a client 225 as a station on the network. A resource is represented as a hard-disk drive 227 connected to resource node R6. Although not shown to keep the diagram simple, there may be other resources connected to any of the resource nodes R1–R7, and to other resource nodes not shown. Also, other client networks may be connected to the client nodes C1–C7, and other client nodes not shown. Separate resources and clients can be connected in network fashion to nodes preferably only up to the ability of the transmission protocol on the client networks and resource branches to handle full load transfer without delay.

In the instant example, client 225 requests a movie, or, in the case of a video jukebox clipping service, as described above, a video clipping, stored at resource disk 227. Each client station has digital intelligence substantially configured like the node illustrated in FIG. 7, and described above. That is, each station has a microprocessor, a memory, sending and receiving circuitry for the client network, and control routines executable by the microprocessor to compose and transmit requests and to receive and process requested data.

Client 225 has a schedule of movies available, or, in the case of the video jukebox service, a list of available clippings, and an input apparatus for making a selection. When the client makes a selection, the digital system at the client station may consult a lookup table and assign a resource code to the transmission, or all selection transmissions may be sent to an account manager. One or more of the resource nodes, or even client nodes, may be assigned the task of account managing for the system. In this example resource node R4 is account manager 229.

The account manager has control routines for accounting and scheduling in addition to routing routines, and has location information for clients and resources on the massively parallel network. In the case of a single account manager, all the resources and clients are mapped at the single manager, and regular maintenance updates for changes in resources and clients (new clients subscribe, some discontinue the service, new clippings become available, older clippings may be discontinued). There may be more than one account manager to share the duty and reduce the load effect at a single manager.

In the case of a single account manager, the instant example, the client makes a selection, and the client station codes the data and transmits it on the client LAN to client node C5. The coded data includes one or more bits addressing the account manager, one or more bits identifying the client, and bits identifying the movie title requested. There may be other information, such as a particular time for transmission, or special information pertaining to charges, etc.

The general process at client node C5, and at other nodes as well, is that incoming transmissions are immediately stored in the node memory, along with priority association for re-transmission. Beyond C5 there is a wide choice of available paths to account manager 229. The necessary intelligence for routing is stored at each client and resource node. For example, from C5, there are two apparently equal "best choices" to R4 (account manager 229). One is to R5, then to R4. The other is to C4, then to R4. There may be some reason in particular implementations why one of these two choices is "best", in which case that path will carry the first priority. If there is no such, one or the other may be first priority arbitrarily.

In one embodiment, the means of routing is "run and shoot"; that is, the node having data for retransmission has test routines for testing the available alternatives by priority, and, on finding a path open, passes the transmission on to a next node. The destination code determines which of five connections (three are shown) is on the shortest, or best, path, and the CPU tests that connection. If the node at the other end is not busy, the request is immediately retransmitted and deleted from memory.

If R5–R4 is the highest priority path from C5 to R4, the CPU at C5 will first poll R5. If R5 is available, retransmission takes place; if it is not, the next node in priority is tested, and so forth, until the stored data for retransmission, in this case, client 225's request for a movie or clipping, is sent on.

In the case of requests from clients, routed to an account manager, each request is a short burst, typically a single data word of 16 or 32 bits, requiring only a very short transmission duration. In this case of transmission of information like a movie, the situation is somewhat different, as is described in more detail below.

It will be apparent to those with skill in the art that there is a broad variety of ways routing may be prioritized and determined. Substantially all are based on priority and testing of some sort.

When client 225's request for a movie or clipping arrives at account manager 229, the request is processed. Client 225's account is charged for the particular movie time or clipping requested, and the updated account is then available for whatever billing cycle is in use. The account manager also associates the material (movie or clipping) requested with the resource location, and initiates the process of sending the data to client 225's site.

The transmission of a command packet issued by the account manager to resource 227 via resource node R6 to cause the requested movie data to be transmitted to client 225 is similar to the transmission of the original request from client 225 to the account manager. The necessary information packet is rather small, requiring such as destination (node R6), movie ID on resource 227, time of transmission, and so forth. The routing of this command packet is accomplished by priority and testing, as described above. At R6 the command packet is stored and processed.

Figure 9:
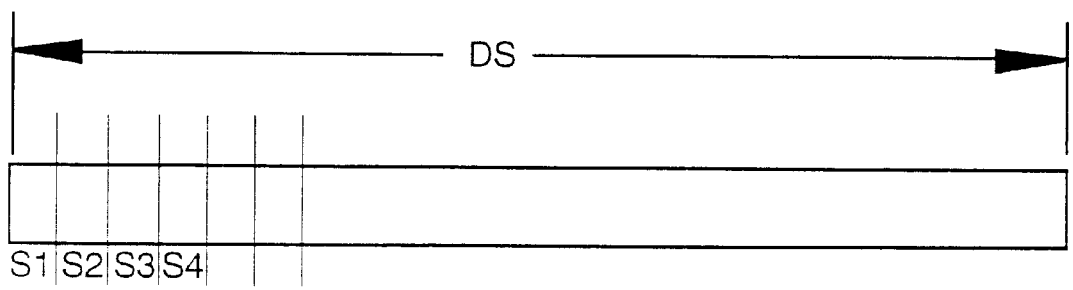
FIG. 9 is a diagram of a data stream representing video data comprising a movie.

The transmission of a complete movie or clipping, which may have a playing time measurable in from several minutes to an hour or more, instead of milliseconds, is a different proposition than transmission of a request or a command packet. FIG. 9 represents the total data length of a movie in transfer time of length DS. In disk 227 the total data string is stored in sectors, each providing, when processed, for example, 1 minute of viewing time of the movie. A movie of three hours length, then, would be stored and processed in 180 sectors S1, S2 . . . , S180. Initial sectors S1, S2, S3, S4, are indicated in FIG. 9. Each sector, although it represents a full minute of viewing time, can be transmitted in perhaps milliseconds as digital data from node to node in the massively parallel network, depending on the characteristics of the data paths and modes of transmission.

In the instant example, Node R6, having received the command packet from the account manager, executes the commands according to stored control routines. Node R6 retrieves a first sector (S1), stores that sector in its local memory, and transmits it on toward client 225 in the same manner as described above for routing requests and command packets. R6 continues to retrieve, store, and delete until it has sent along all of the sectors for the movie or clipping, after which it may (or may not) issue an acknowledgement to the account manager, depending on the vagaries of the particular protocol and application.

Given the massively parallel nature of the network, wherein each node has four connections in the same array (resource or client), and one each to the opposite array, and either a resource trunk or a client LAN connection, there is no guarantee that consecutive sectors will follow a common path from resource 227 to client 225. Unless the loading is low, it is not likely. There is no need, however, for all of the sectors of the movie to follow one another in sequential fashion or even to arrive in order.

Each sector transmitted through the maze of the massively parallel network is coded (sector #, destination, etc.), and as each sector arrives at client LAN station 225, it is recorded in memory according to prearranged addresses. After at least one sector is available, the playback may begin, by converting the available data to video signals and transmitting the signals to the video display. In most cases this is a CRT video tube, but that is not a requirement. As other types of displays (LCD, ELD, etc.) become more common for TV and high definition TV, the equipment at the client station can be updated to operate with the later apparatus.

Figure 10:
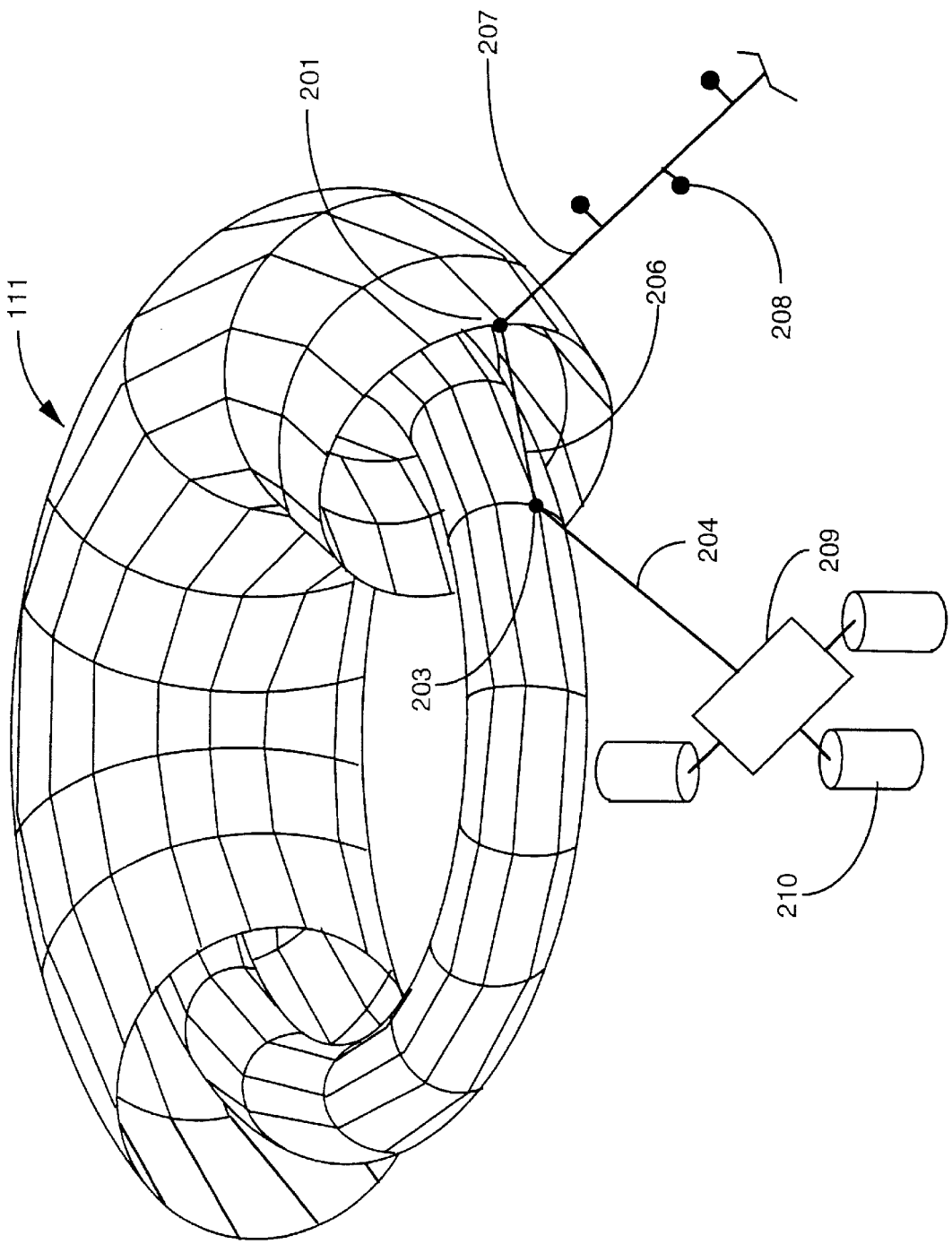
FIG. 10 is an isometric illustration of a massively parallel network according to an embodiment of the invention, configured as nested tori.

FIG. 10 is a massively parallel network according to an embodiment of the invention wherein the resource array and the client array are configured as nested tori. In this example the outer torus is a client array 111 and the inner torus is a resource array 113. Each intersection on client array 111 and resource array 113 is a node in the massively parallel network. In another embodiment the position of the client array and resource array may be reversed. The torus representation geometrically is equivalent to matrix array like that presented in FIG. 5. FIG. 10 is meant to illustrate the toroidal nature of the interconnecting geometry, and no attempt has been made to match nodes by position or number.

In FIG. 10 a portion of the outer torus (client array) is shown cut away to illustrate the inner torus (resource array). A single client node 201 is shown connected to a single resource node 203 and to a client LAN 207 having at least one client station 208. Each client node is connected in two rings, one around the major diameter of the torus, and the other around the minor diameter, as is each resource node on the opposite torus array. Resource node 203 is connected to a resource hub 209 having at least one resource 210. These elements are exemplary and representative. Although not shown in FIG. 10, each resource node is connected to a client node and to a resource hub, and each client node is connected to a resource node and a client LAN.

It will be apparent to those with skill in the art that the nested torus arrangement is illustrative and not limiting. The same connectivity is illustrated in the matrix arrays of FIG. 5, wherein the node at the end of each row is connected back to the first node in the row, and the node at the bottom of each column is connected back to the node at the top of the column.

In one embodiment, the tori are configured as PCBs locally to fit inside a case 211 similar to the case illustrated and described with reference to FIG. 6A. Case 211 would have the required number of I/O ports equal to the total number of client nodes and resource nodes.

In this alternate embodiment of the invention, the massively parallel network architecture may be applied as a large transaction system in real time. For example, a banking system may be implemented by allocating client nodes to different local bank branches with dedicated communication trunks to tellers' workstations and ATM machines. ATM limits could be relaxed because each customer's balance may be updated quickly throughout the system. Massively parallel network architecture allows for flexibility in data resource configuration and allows for a large number of branch banks to maintain current transaction status.

In the transactional banking application described above, the resource array and the client array might both be local, perhaps as shown in FIG. 6A, or in some other local arrangement. In this case there would be communication trunks from the local client nodes going to the different branch or ATM locations. In an alternative arrangement, the client nodes might be remotely located at the branch or ATM.

In another embodiment of the invention, massively parallel network architecture could manage large data flow in a paperless company. For example, a large business may have as many as 100 fax lines, each capable of generating a page of fax containing approximately 30 kilobits about every fifteen seconds. In this application, some client nodes may service several users' fax requests and some resource nodes may be dedicated to fax modems, attached telephone lines and media storage devices for storing faxes. In this configuration, a business can effectively manage fax flow, reducing the need for a large number of fax machines and telephone lines.

It will be apparent to one skilled in the art that there are many changes that might be made without departing from the spirit and scope of the invention. For example, relative to the massively parallel network system, any number of tori may be nested within one another and effectively interconnected by the addition of communication links. Massively parallel network systems according to embodiments of the invention can be reconfigured from without for different applications or to update data and operating protocol for an existing application.

In a further aspect of the massively parallel portion of the present invention, a massively parallel system may be re-configured at times of system expansion. A system-wide hashing control routine could redistribute resource locations according to results of tracked transactions to provide for optimal performance. In these and other applications and embodiments, massively parallel network architecture according to the invention can provide effective, real-time access for a large number of users.

In various embodiments within the spirit and scope of the invention, microprocessors of many sorts and manufacture may be used. The same variability applied to memories and auxiliary circuitry, such as routing circuitry. Nodes may be accomplished as single ASICs, as described in embodiments herein, or in more than one IC. Similarly the variability of programmed control routines is very great, and the means of prioritizing and routing is similarly variable within the spirit and scope of the invention.

There are many ways to geometrically arrange nodes for such a system as well. This variability is illustrated above by the representation of essentially the same system as two levels of matrix arrays, and as nested tori. But the physical arrangement and relationship of nodes to one another is not limited by any one of the suggested arrangements. The connectivity is the principle constraint. There are many other alternatives not herein discussed that still should be considered as within the spirit and scope of the invention.

What is claimed is:

1. A method of providing video entities to users, comprising the steps of:

storing data identifying a user's interests;

receiving video entities at server, the server being one of a plurality of servers distributed across a wide area network at which the video entities are received;

transmitting to the user via a digital data link notification of receipt of a video entity corresponding to the data identifying the user's interests; and downloading via the digital data link the video entity corresponding to the data identifying the user's interest to the user from the server.

2. The method of claim 1, further comprising the step of accumulating data regarding video entities downloaded to the user.

3. The method of claim 2, further comprising the step of preparing billing data for downloading of video entities.

4. The method of claim 1, wherein the step of notifying the user of receipt of a video entity comprises forwarding an e-mail to the user.

5. The method of claim 1, further comprising the step of maintaining a database comprising information identifying topics of interests to which video entities relate.

6. The method of claim 5, further comprising the step of searching the database for video entities corresponding to the user's interest.

7. The method of claim 1, further comprising the step of loading new video entities and distributing the new video entities to the plurality of distributed servers.

8. The method of claim 7, wherein loading new video entities comprises identifying topics of interests to which the new video entities relate.

9. A method of providing video entities to users, comprising the steps of:

receiving copies of video entities at a plurality of servers distributed across a wide area network;

maintaining a database of users' topics of interests;

identifying video entities corresponding to users' topics of interests;

transmitting to the users via digital data links notification of receipt of video entities corresponding to users' topics of interests; and downloading to users via the digital data links video entities corresponding to users' topics of interests from plurality of distributed servers.

10. The method of claim 9, further comprising the step of accumulating data regarding video entities downloaded to users.

11. The method of claim 10, further comprising the step of preparing billing data for downloading of video entities.

12. The method of claim 9, wherein the step of notifying users of video entities comprises forwarding e-mails to users.

13. The method of claim 9, further comprising the step of maintaining a database comprising information identifying topics of interests to which video entities relate.

14. The method of claim 13, further comprising the step of searching the database comprising information identifying topics of interests to which video entities relate for video entities corresponding to users' interests.

15. The method of claim 9, further comprising the step of loading new video entities and distributing the new video entities to the plurality of distributed servers.

16. The method of claim 15, wherein loading new video entities comprises identifying topics of interests to which the new video entities relate.

17. A system for delivering video entities, comprising:
- a plurality of servers distributed over a wide area networke, each of the plurality of distributed servers operable to receive video entities distributed to all of the servers; and
- at least one additional server, said at least one additional server operable to store data identifying users' topics of interests, transmit to users notification of receipt at said plurality of geographically distributed servers of video entities corresponding to users' topics of interests, and initiate downloading of video entities corresponding to users' topics of interest from the plurality of geographically distributed servers to users.

18. The system of claim 17, further comprising video input apparatus for loading new video entities and distributing new video entities to said plurality of distributed servers.

19. The system of claim 17, wherein said at least one additional server is further operable to accumulate data regarding video entities downloaded to users.

20. The system of claim 19, wherein said at least one additional server is further operable to prepare billing information for users.

21. The system of claim 17, wherein said plurality of distributed servers and said at least one additional server communicate over a wide area network.

22. The system of claim 17, wherein said at least one additional server is operable to forward e-mails to users notifying users of receipt of video entities corresponding to users interests.

23. The system of claim 17, wherein said at least one additional server comprises a plurality of servers.

* * * * *

UNITED STATES PATENT AND TRADEMARK OFFICE
CERTIFICATE OF CORRECTION

PATENT NO. : 6,490,725 B2
DATED : December 3, 2002
INVENTOR(S) : Dan Kikinis

It is certified that error appears in the above-identified patent and that said Letters Patent is hereby corrected as shown below:

Column 1,
Line 26, please delete "client" and insert therefore -- clients --;

Column 3,
Line 4, please delete "conneection" and insert therefore -- connection --;

Column 4,
Line 40, please insert -- be -- after the word "may";

Column 6,
Line 22, please delete "case" and insert therefore -- cases --;

Column 17,
Line 3, please delete "networke" and insert therefore -- network --;

Signed and Sealed this

Fourteenth Day of October, 2003

JAMES E. ROGAN
*Director of the United States Patent and Trademark Office*